United States Patent [19]

Matt

[11] 4,433,237
[45] Feb. 21, 1984

[54] COATING SYSTEM CONTROL HAVING A SENSOR INTERFACE WITH NOISE DISCRIMINATION

[75] Inventor: Timothy S. Matt, Bay Village, Ohio

[73] Assignee: Nordson Corporation, Amherst, Ohio

[21] Appl. No.: 301,522

[22] Filed: Sep. 14, 1981

[51] Int. Cl.³ .............................................. G01V 9/04
[52] U.S. Cl. ............................. 250/222.1; 250/223 R; 118/682
[58] Field of Search ................ 250/221, 222.1, 223 R, 250/224; 328/5; 118/663, 676, 682

[56] References Cited

U.S. PATENT DOCUMENTS

| | | |
|---|---|---|
| 3,252,441 | 5/1966 | Hargreaves . |
| 3,458,770 | 7/1969 | Denger . |
| 3,682,131 | 8/1972 | Algeri et al. . |
| 3,731,205 | 5/1973 | Gardner . |
| 3,855,467 | 12/1974 | Chope . |
| 3,862,414 | 1/1975 | Algeri . |
| 3,946,224 | 3/1976 | Allera et al. . |
| 4,011,447 | 3/1977 | Henderson . |
| 4,079,323 | 3/1978 | Blanyer . |
| 4,166,246 | 8/1979 | Matt . |

Primary Examiner—F. L. Evans
Attorney, Agent, or Firm—Wood, Herron & Evans

[57] ABSTRACT

A sensor circuit in a system for automatically coating objects with a coating material wherein the coating material is discharged onto objects moving in a path relative to a discharge station in response to a control signal. A sensor detects the presence of an object at a point along the path upstream of the discharge station and produces an object detection signal which is processed by the sensor circuit to produce a sensor signal. The sensor signal is used by a timing and driver circuit to provide a delayed control signal to the coating material discharge apparatus, after an appropriate delay, for a desired duration. The sensor circuit includes an integrator for integrating the object detection signal produced by the sensor and a trigger circuit coupled to the integrator for providing a substantially rectangular wave output derived from the integrated object detection signal. The rectangular wave output is coupled to the timing and driver circuit to produce the delayed control signal for the discharge of the coating material.

10 Claims, 4 Drawing Figures

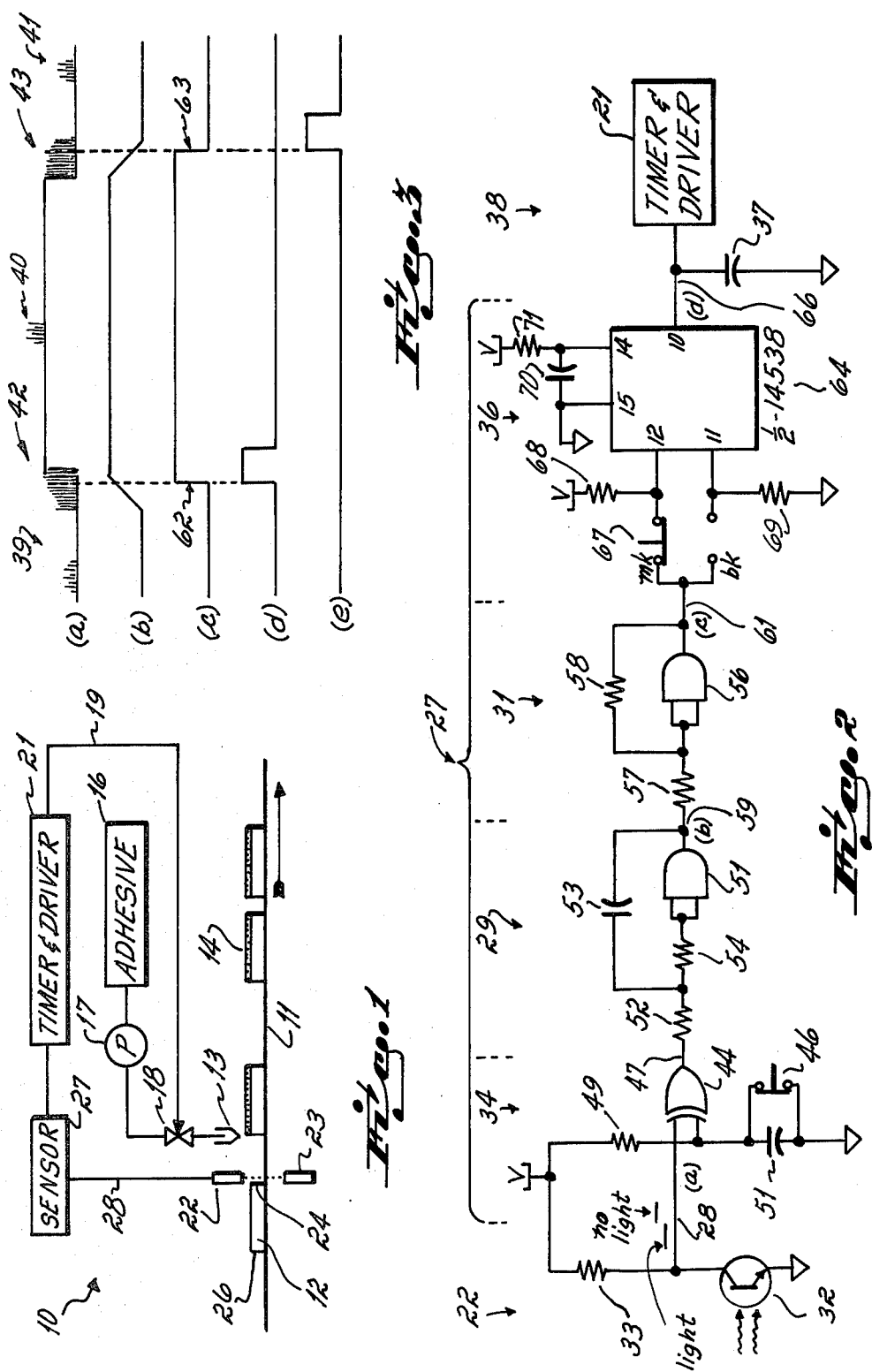

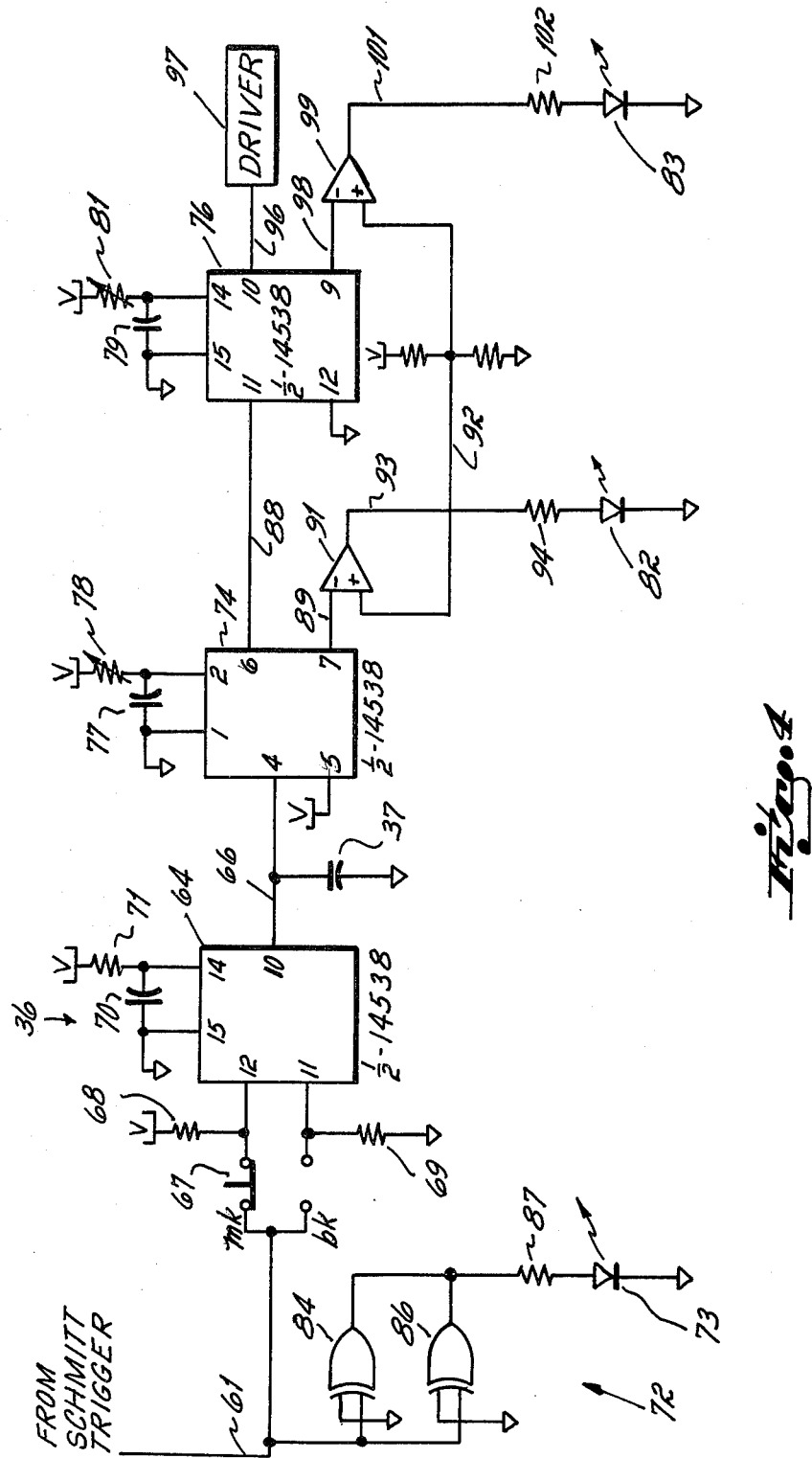

COATING SYSTEM CONTROL HAVING A SENSOR INTERFACE WITH NOISE DISCRIMINATION

DESCRIPTION OF THE INVENTION

This invention relates generally to controls for systems for automatically coating objects with a coating material and, more particularly, concerns a sensor circuit arrangement in such a control.

In automatic coating systems, objects are moved sequentially relative to a coating station at which a coating material is discharged upon the objects as they move past the station. Typical of such coating systems are spray systems for paints and adhesive application systems such as for the dispensing of hot melt adhesives.

In such coating systems, controls are employed to intermittently actuate a coating material discharge apparatus so that the coating material is deposited only upon each object, or a certain portion thereof, when the object is at a predetermined position relative to the discharge apparatus. Typically, a sensor is positioned upstream of the coating station along the path of travel of the objects to be coated to sense the presence of an object at a particular location relative to the coating station. The sensor is coupled through interfacing sensor circuitry to timing and driver circuits to produce a delayed control signal for the discharge apparatus. The delay accounts for the time necessary to move the object to the discharge station. The delayed control signal effects the discharge of the coating material such as by opening a valve to permit the discharge of the material through a nozzle.

As will be noted below with regard to an exemplary embodiment, the invention may find advantageous, but not exclusive, use in a system for dispensing hot melt adhesive onto objects wherein object detection is performed by a photosensor. In such a system, the photosensor is positioned upstream of the adhesive dispensing station and is usually operable to produce an object detection signal at the leading and trailing edges of an object passing thereby. The photosensor is normally a phototransistor which is coupled to a power supply and produces an output which varies dependent upon the amount of light received by the phototransistor. A light source, such as an incandescent bulb, is located on an opposite side of the object path from the phototransistor and produces a beam of light which is aimed at the light-sensitive surface of the phototransistor. As objects move through the light beam, the impedance of the phototransistor varies producing a different output signal dependent upon whether light is received from the light source or blocked by a passing object.

This object detection signal is ultimately used to initiate the operation of timers which establish the delay time for the object to reach the adhesive dispensing station and the duration time for the application of the adhesive to the object. The timer outputs are coupled through driver circuitry to effect the opening and closing of a valve to control the flow of the adhesive.

The object detection signal from the photosensor exhibits a difference in level dependent upon whether or not an object is interposed between the light source and the photosensor. For example, the photosensor output might be such that the object detection signal is high (at a voltage approximately equal to the dc supply) when light from the light source is fully incident upon the phototransistor, and low (approximately zero volts) when the light from the light source is fully blocked by an object.

The transition of the object detection signal between these two states, high and low, is not smooth nor is it instantaneous. For example, as the leading edge of the object breaks the light beam from the light source to the photosensor, an interval of relatively wide voltage swings occurs as the detection signal changes from a value near the supply voltage to near zero. This interval of detection signal fluctuation is produced by a combination of factors including the response time of the phototransistor and irregularities in the leading and trailing edges of the objects being detected.

In hot melt adhesive dispensing systems of the above-mentioned type, objects are moved by a conveyor at relatively high speeds such as 600 to 1200 feet per minute. In such situations, the sensors presently used are usually photosensors although it is possible that other types of sensors may find application at these speeds. For example, when metal objects are being coated, Hall effect sensors might be used. In any event, with all known types of sensors adaptable for use in such applications, there are transition intervals for the detection signal. Photosensors have a transition interval generally of a duration of about one to three milliseconds. Limit switches exhibit 10 to 30 millisecond transition intervals.

Also appearing with the object detection signal are various types of noise pulses of generally short duration such as those created by electromagnetic induction in the object detection signal line. The noise is created by the various forms of electromagnetic radiation produced by the motors and switches in the typical adhesive dispensing system environment.

It is important to ensure that the timing and driver circuitry of the adhesive dispensing control system is not activated by spurious noise signals from the object detection signal line in order to prevent the application of adhesive onto a conveyor or in improper locations on the objects being coated. In the past, analog transistor circuits have been used to process the object detection signal to effectively filter out the noise impulses. Such circuits also remove much of the varying pulses from the transition interval of the object detection signal. The response of such analog circuits to object detection signal transitions is slow, and the circuits are impractical for use in systems with high conveyor speeds such as in the order of 600 to 1200 feet per minute.

Another approach to interfacing between the object detection signal and the timer and driver circuitry of an adhesive dispensing system has been the use of a sampling circuit, together with additional filtering. In this sampling circuit at least two successive samples must be the same before a signal transition is recognized and used to initiate a timing sequence for the application of adhesive. Such a sampling technique inherently has some small but finite percentage of error, and as line speeds are increased, the number of errors increases correspondingly. In addition, in a sampling approach, the sampling circuit will "confirm" the detection of an object at a range of times throughout the one to three millisecond transition interval, or at the end of the interval, once the photosensor has stabilized. This introduces an uncertainty as to the location of an object when the sensor signal is produced.

It is the general aim of the invention, in automatic coating systems of the foregoing type, to provide an improved sensor circuit arrangement which has greater noise discrimination without deleteriously affecting the response time of the circuit.

It is a related object of the invention to provide such a sensor circuit in which a sensor signal is produced at a substantially consistent time relative to the beginning of a sensor transition interval.

In carrying out the invention, a sensor circuit arrangement for an automatic coating system is provided in which an integrator is coupled to the output of an object detecting sensor to produce a signal representative of the integral of that output, and a trigger circuit receives the integrated signal for producing a substantially rectangular wave output which is in turn coupled to the timing and driver circuitry of the coating system.

An advantage of the invention is its ability to effectively discriminate against noise on an object detection signal line while maintaining a relatively fast and consistent response time for the production of a sensor signal output at each true object detection transition.

It is a subsidiary object of the invention to provide a conveniently incorporated diagnostic indication system for the sensor circuit arrangement and its succeeding circuitry.

Other objects and advantages of the invention will become apparent upon reading the following detailed description and upon reference to the drawings, in which:

FIG. 1 is a simplified diagrammatic illustration of an automatic adhesive dispensing system;

FIG. 2 is a circuit diagram of a sensor circuit arrangement in accordance with the present invention;

FIG. 3 is a series of waveforms from various points in the schematic diagram of FIG. 2; and FIG. 4 is a circuit diagram of a portion of the sensor circuit and a timer circuit, illustrating the diagnostic feature of the system.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents and alternatives falling within the spirit and scope of the invention as defined by the appended claims.

Turning first to FIG. 1, a system for automatically coating objects with a coating material is exemplified by an automatic hot melt adhesive dispensing system 10. In the system 10, a conveyor 11 moves a series of objects 12 past a hot melt adhesive discharge nozzle 13 through which beads of hot melt adhesive 14 are applied to the objects 12. The hot melt adhesive is supplied to the nozzle 13 from an adhesive tank 16 by a pump 17. The adhesive is supplied to the nozzle 13 through a valve 18, the opening of which is effected by a control signal on a control line 19 from a timer and driver circuit 21.

In order to synchronize the application of the control signal on the line 19, and hence the opening of the valve 18 and the flow of adhesive through the nozzle 13, with the movement of the objects on the conveyor 11, a photosensor 22 senses the presence of objects 12 at a particular point as they move toward the nozzle. The photosensor 22 receives light from a light source 23 in a beam which is broken by the leading edge 24 of an object 12 and restored by the passage of the trailing edge 26 of the object. The photosensor 22 is electrically coupled to a sensor circuit 27 so that an object detection signal, marked by transitions at the passage of the leading and trailing edges of each object, is produced on the line 28. The sensor circuitry 27 processes the signal appearing on the line 28 to provide a sensor signal to the timer and driver circuit 21 indicative of the sensing of the object 12 at, for example, its leading edge. The timer and driver circuitry, in known fashion, delays the application of a control signal to the valve 18 until sufficient time has passed for the object 12 to reach the nozzle 13, and then applies the control signal for the necessary duration to apply a desired length of adhesive bead 14 to the object.

With reference now to FIG. 2, a sensor circuit in accordance with the present invention has an integrator 29 coupled to the photosensor 22 and a Schmitt trigger circuit 31 connected to the integrator. The photosensor 22 is a phototransistor 32, such as a Fairchild FPT 130, connected in series with a resistor 33 between a positive supply voltage V and common. The circuit common is preferably not connected to earth ground in order to reduce noise pickup in the circuitry. The phototransistor 32 has a low resistance when activated by light and a very high resistance when not so activated. When light from the light source 23 (FIG. 1) is incident upon the phototransistor, the input line 28 is coupled through the phototransistor to common, and the voltage on the line 28 at the junction between the transistor collector and the resistor 33 is low. If light to the phototransistor 32 is blocked, such as by the interposition of an object between the light and the sensor, the transistor is substantially open and the voltage at the transistor collector is high, approximately the supply voltage.

The output from the collector of the phototransistor 32 is connected to a rise time and fall time control 34 whose output is a signal which changes from zero volts dc to the supply voltage V at a consistent steep slope and from the supply voltage V to zero volts at another consistent steep slope. The circuitry 34 not only produces a signal with these consistent rise and fall times, but it also eliminates electrical noise pulses with magnitudes less than 45% of the supply voltage. This output signal from the rise time and fall time control is connected to the integrator 29, which eliminates short duration noise pulses. The integrator 29 also integrates the pulses from the transition interval when the phototransistor is detecting the leading or trailing edge of an object. The output of the integrator is coupled to a Schmitt trigger circuit 31 which eliminates the oscillations or multiple triggers that could occur in subsequent circuitry due to slow rise or fall times in the signal out of the integrator 29. The variable width pulses out of the Schmitt trigger 31 are then coupled to a monostable one-shot multivibrator 36 which is operable to produce pulses of a controlled width at either the leading or trailing edge of the signal from the trigger circuit 31. A capacitor 37 serves as a minimum pulse width filter 38 to allow only signals of greater than a prescribed minimum pulse width to pass to the timer and driver circuitry 21. Typically, the capacitor 37 is included with the timer and driver circuitry to filter out short duration noise or other pulses which appear on the line connecting the multivibrator 36 to the timer and driver circuitry 21.

Looking at the sensor circuit in more detail, the object detection signal output from the photosensor is shown diagrammatically in FIG. 3(a). Areas 39 and 41 are indicative of induced noise pulses on the photosensor output line typically created by electromagnetic field variations in the vicinity of the line. Such noise may also appear as indicated at 40 superimposed on the voltage which is on the detector signal line 28 when the phototransistor 32 is dark. The detector signal voltage when the phototransistor 32 is dark is approximately the supply voltage V.

The transition intervals in the object detection signal between low and the supply voltage V are indicated at 42 and 43, and the signal level over the intervening area is the supply voltage, which is on the object detection signal line when the phototransistor is dark. Thus, the illustrated transition interval 42 represents a leading edge of an object, and the transition interval 43 represents the trailing edge of the object moving along the conveyor path. The FIG. 3(a) waveform should be regarded as being diagrammatic. For example, the frequency and location of noise will vary considerably among coating systems. The frequency and amplitude of the pulses in the transition intervals 42 and 43 will depend upon a variety of factors including the nature of the edges of the object, the type of sensor employed, and the speed of movement of objects past the sensor.

The object detection signal is connected to one input of an exclusive OR gate 44, and the other input of the OR gate is connected to common through a switch 46. During normal operation, this input of the OR gate 44 is maintained low. Therefore, "highs" in the FIG. 3(a) waveform connected to the other input of the OR gate are coupled therethrough to the gate output 47. The OR gate 44 is preferably a CMOS device and will recognize a "high" input as one which is greater than 45% of the supply voltage. Thus, noise pulses less than 45% of the supply voltage V will not pass through the gate to its output. Each of the inputs to the OR gate are coupled to the supply voltage through pullup resistors 33 and 49 respectively, to prevent damage to the gate 44 which would be caused by a "floating" input to the gate. Such a condition would arise, for example, if the object detection signal line from the phototransistor were disconnected. The resistor 49 also serves as a charging path for a capacitor 51 which is connected in parallel with the switch 46. If the switch 46 is opened, the capacitor 51 charges to a logic high which is applied to the input to the OR gate 44. If the other input (from the phototransistor) to the OR gate is low, the high from the capacitor 51 is coupled through the OR gate to its output 47. In this manner, a "test" object detection signal can be placed into the system for checking the system circuitry in lieu of employing the phototransistor 32, as shall be discussed more fully hereinafter.

The signal at the output 47 of the OR gate 44 is a series of pulses having consistently short rise and fall times which are in the order of 10 to 20 nanoseconds. The pulse width at the output 47 is established by the length of time that each pulse at the input of the OR gate remains above 45% of the supply voltage. These variable width pulses at the OR gate output 47 are then integrated by an integrator circuit 29. The integrator 29 includes an amplifier 51 having an input resistor 52 and a feedback capacitor 53. The integrator has a time constant, determining the slopes at rising and falling edges, determined by the RC product of the resistor 52 and the capacitor 53. A protection resistor 54 for the amplifier 51 is provided to insure against damage to the amplifier by discharging of the capacitor 53. The output waveform of the integrator 29, which is the output 59 of the amplifier 51, is shown in FIG. 3(b). As the transition pulses in the interval 42 are received by the integrator 29, its output 59 ramps up to a full-on value substantially equal to the supply voltage V. Similarly, during the transition pulse interval 43, the output voltage of the integrator 29 ramps down to zero. In the illustrated system, the output of the integrator remains high during each period of time of the sensing of an object, when the phototransistor 32 is dark.

In order to place the slowly rising and slowly falling edges of the integrator output waveform into a form for cooperating with digital circuitry, such as for triggering the timers in the timer and driver circuit 21, the integrator output is coupled to a Schmitt trigger circuit 31. In the Schmitt trigger circuit 31 there is an amplifier 56 which has an input resistor 57 and a feedback resistor 58 forming a voltage divider. The resistance values are chosen such that, for example, the output 61 of the amplifier 56 is high once the input 59 to the Schmitt trigger is above 75% of the supply voltage. The output 61 of the Schmitt trigger circuit then remains high until the input at 59 falls to below 25% of the supply voltage. This, in effect, sharpens the edges of the output pulse from the integrator 29 as is shown in the Schmitt trigger output waveform in FIG. 3(c).

The leading edge 62 and the trailing edge 63 of the pulse at the output 61 of the Schmitt trigger correspond to the leading edge of an object and the trailing edge of the object, respectively. If desired, the pulses at the output 61 can be coupled directly to the timer and driver circuitry, which is then operative to detect either the leading edge 62 or the trailing edge 63 of each pulse to initiate the appropriate delay time to allow positioning of the object relative to the adhesive nozzle 22.

In order to reduce the power required to maintain the line to the timer and driver circuitry at a high level for relatively long periods of time, and to permit the use of additional minimum pulse width filtering for noise immunity, the sensor circuit 27 preferably also includes a monostable one shot multivibrator 36 which is operable to produce a controlled width pulse at either the leading edge or the trailing edge of each pulse at the output of the Schmitt trigger 31. The monostable one shot 36 includes a precision retriggerable/resettable monostable multivibrator integrated circuit 64 which is one-half of a Motorola-type MC14538B CMOS chip. The multivibrator 64 is responsive to either a rising edge 62 at its pin 12 input, or a falling edge 63 at its pin 11 input to produce a positive output pulse on an output line 66 which is connected to pin 10 of the multivibrator. A switch 67 is interposed between the Schmitt trigger 31 and the multivibrator 64 to couple the Schmitt trigger output 61 to either pin 11 or pin 12 of the multivibrator. With the switch 67 in the position illustrated, connecting the Schmitt trigger output 61 to the multivibrator pin 12, the output of the multivibrator on the line 66 will be a pulse initiated by the trailing edge of the Schmitt trigger pulse. In this way, the multivibrator is operating in the "make light" mode, producing a pulse at the trailing edge of an object. The timing of a "make light" multivibrator output pulse on the line 66 is illustrated in FIG. 3(e). If the switch 67 is placed in the "break light" position to couple the Schmitt trigger output to pin 11, the resulting waveform at the output of the multivibrator is a pulse initiated at the leading edge of the Schmitt trigger output pulse, at the leading edge of an object, as shown in FIG. 3(d).

A pull-up resistor 68 couples pin 12 of the multivibrator to the supply voltage, and a pull-down resistor 69 couples pin 11 of the multivibrator to common. This prevents the pins from floating when they are not coupled to the Schmitt trigger output through the switch 67. The duration of the output pulse on the line 66 is determined by the RC time constant of a capacitor 70 and a resistor 71 connected to the multivibrator in conventional fashion.

The output pulse from the multivibrator 36 on the line 66 may be, for example, a pulse of 200 to 500 microseconds in duration. This pulse is coupled to the timer and driver circuitry 21. A capacitor 37 is advantageously connected between the line 66 and common to serve as a minimum pulse width filter. Most preferably, the capacitor 37 is connected to the line near the timer and driver circuitry 21. In this way, noise pulses of relatively short duration, less than 200 microseconds, for example, may be filtered from the true sensor signals from the multivibrator output.

In an exemplary adhesive dispensing system, it has been found that the transition intervals 42 and 43 are generally on the order of about one to three milliseconds for photosensors. Former low speed analog systems and digital sampling systems have generally recognized a true object detection signal and generated a sensor signal approximately at the end of the transition interval, and thus as long as three milliseconds after the beginning of a "make light" or "break light" transition. I have found that using a sensor system such as that shown in FIG. 2, produces a sensor pulse on the line 66 typically about one-half of a millisecond to one millisecond after the beginning of a transition interval. In addition, the present sensor circuit arrangement, unlike a digital sampling approach, eliminates substantially all spurious sensor signals due to noise.

In order to readily identify the location of failures in the sensor circuit and its succeeding circuitry, the sensor circuit 27 preferably includes an indicator light circuit 72 as shown in FIG. 4. The indicator light circuit 72 is coupled between the output line 61 from the Schmitt trigger circuit 31 and the circuit common. Whenever the Schmitt trigger output line 61 is high, a light emitting diode 73 in the indicator circuit 72 is illuminated.

As was noted earlier, a switch 46 (FIG. 2) is actuable to introduce an object detection signal into the sensor circuit in the absence of a photosensor input. This test signal switch 46 cooperates with the indicator circuit 72 to permit checking the operation of the sensor circuit 27. When the switch 46 is depressed and released, a pulse is coupled into the sensor circuit which results in a pulse at the Schmitt trigger output 46, illuminating the photodiode 73. Preferably, subsequent circuitry, such as the timers in the timer and driver circuit 21 (FIG. 2) also include means for indicating proper operation. In the present instance, such means are provided for the timers in the timer and driver circuit 21 by the provision of photodiodes which are activated by pulses on the output 66 of the multivibrator circuit 36. A multivibrator output pulse may be produced either by a signal from the photosensor 22 or by the operation of the test switch 46.

As illustrated in FIG. 4, the multivibrator output 66 is coupled to a delay timer 74 which is in turn coupled to a duration timer 76. The delay timer 74 and the duration timer 76 each comprise one-half of a dual precision retriggerable/resettable monostable multivibrator, Motorola type number MC14538B. The delay time for the delay timer 74 is determined by the RC time constant of a capacitor 77 and a potentiometer 78. The delay time is set by adjusting the potentiometer 78. In a similar fashion, a capacitor 79 and a potentiometer 81 establish a duration time for the duration timer 76. In the present instance, the delay timer 74 sets a delay time beginning with the receipt of a sensor signal in order to allow an object to reach the adhesive dispensing station. The duration timer 76 provides a duration interval for the activation of the adhesive dispenser as the object passes the adhesive dispensing station.

During the delay time established by the delay timer 74, a photodiode 82 is illuminated, indicating proper operation of the delay timer. In like fashion, during the duration time established by the duration timer 76, a photodiode 83 is illuminated.

Viewing the diagnostic aspect of the system in more detail, a test signal is placed into the sensor circuit 27 by the depression and release of the test switch 46. This produces a pulse on the output line 61 from the Schmitt trigger which is coupled to one input of each of a pair of exclusive OR gates 84 and 86. The other input to each of the OR gates is connected to common, so that when the pulse appears on the line 61, the output of each OR gate goes high. This high output of the OR gates is coupled through a resistor 87 and the photodiode 73, illuminating the photodiode. The photodiode will, of course, be illuminated for the duration of the positive pulse on the Schmitt trigger output line 61.

The Schmitt trigger pulse is coupled through the monostable one-shot multivibrator 36, which produces the preselected duration output pulse on the line 66. This pulse is wide enough to pass the minimum pulse width filter capacitor 37, and is input to the delay timer 74. On the rising edge of the pulse from the multivibrator output 66, the delay timer begins the preselected delay time. During the delay time, the output 88 of the delay timer is high, and the output 89 is low.

The delay timer output 89 is connected to the inverting input of an amplifier 91. The non-inverting input 92 of the amplifier 91 is held at a voltage between the supply voltage V and common. Therefore, when the input 89 to the amplifier 91 is low, during the delay interval, the output of the amplifier 93 is high. The high output 93 is coupled through a resistor 94 and the photodiode 82 to common, illuminating the photodiode. Thus, the photodiode 82 is illuminated during each delay interval. At the end of the delay interval, the timer output 89 goes high, deenergizing the photodiode.

The output 88 from the delay timer 74 returns low at the end of the delay interval. The falling edge of the output 88 activates the duration timer 76. The output 96 of the duration timer 76, which is coupled to a driver circuit 97, goes high, activating the driver. During the duration interval, the output 98 of the duration timer 76 goes low. This output 98 is connected to the inverting input of an amplifier 99, whose non-inverting input is the intermediate voltage 92. Therefore, during the duration interval, the output 101 of the amplifier 99 is high, and this high output is coupled through a resistor 102 and the photodiode 83 to common, illuminating the photodiode. During the duration interval, the output 98 remains low and the photodiode 83 remains illuminated. At the end of the duration interval, the output 98 goes high, the amplifier output 101 goes low, and the photodiode 83 turns off. At the same time, the duration timer output 96 goes low, deactivating the driver 97.

In the illustrated system, the photodiodes 73, 82 and 83 are illuminated during portions of the system operating cycle, either in response to a photosensor input to the sensor circuit or in response to the operation of the test switch 46. In this way, the system may be diagnosed by using the test switch 46 to simulate a cycle of operation. During such a test, the driver 97 is ordinarily deactivated or disconnected from the duration timer output line 96. In the event of a failure in the sensor or timer system, the indicator light or lights at and beyond the failure point do not operate. This facilitates determining the location of a failure. If desired, additional lights may be added at different points in the sensor and timer circuits or in subsequent circuitry such as the driver circuit.

What is claimed is:

1. In a system for automatically coating objects with a coating material having means for discharging the coating material in response to a control signal, means for moving the objects relative to the discharge means in a path past the discharge means and a timing and driver circuit for generating, in response to a sensor signal at an input, a delayed control signal which is coupled to the discharge means, an improved sensor circuit arrangement comprising:

object detecting means, including a sensor positioned along the path, for producing an object detection signal at an output when an object reaches a particular position along the path;

an integrator coupled to the output of the object detecting means operable to produce at an output a signal representative of the integral of the detecting means output; and a trigger circuit coupled to the integrator output and operable to produce a wave having substantially sharp edges at an output which is coupled to the input of the timing and driver circuit.

2. The sensor circuit arrangement of claim 1 in which the output of the object detecting means is coupled to the input of a gate, and the output of the gate is coupled to the integrator, the gate having a threshold below which signals at its input are not coupled to its output.

3. The sensor circuit arrangement of claim 2 which further comprises a pulse generator circuit having an input coupled to the output of the trigger circuit and having an output coupled to the timing and driver circuit, the pulse generator circuit being operable to produce a pulse of a set duration in response to an edge of the output of the trigger circuit.

4. The sensor circuit arrangement of claim 3 which further comprises a minimum pulse width filter coupled to the output of the pulse generator circuit for eliminating pulses from the output which are of a duration less than said set pulse duration of the pulse generator.

5. A method for producing a sensor circuit signal indicative of the position of an object in a system for automatically coating objects with a coating material which has means for discharging the coating material in response to a control signal, means for moving the objects relative to the discharge means in a path past the discharge means, and a timing and driver circuit for generating, in response to the sensor signal at an input, a delayed control signal which is coupled to the discharge means, comprising the steps of:

detecting the presence of an object at a point along the path to produce an object detection signal which includes a variable level transition interval between times when an object is detected and times when an object is not detected, and containing noise pulses of relatively short duration;

integrating the object detection signal; and shaping the integrated signal with a trigger circuit to produce an output wave having substantially sharp edges which are utilizable as a sensor signal for the timing and driver circuit.

6. The method of claim 5 which includes the additional step, prior to said integrating step, of removing from said object detection signal all portions thereof falling below a predetermined threshold level.

7. The method of claim 6 which comprises the additional step, after said shaping step, of producing a sensor pulse of set duration in response to an edge of said output wave having substantially sharp edges.

8. The method of claim 7 which further comprises the step, after said sensor pulse production step, of filtering from said signal all pulses of duration less than said set pulse width.

9. In a system for automatically coating objects with a coating material having means for discharging the coating material in response to a control signal, means for moving the objects relative to the discharge means in a path past the discharge means, object detecting means including a sensor positioned along the path for producing an object detection signal at an output when an object reaches a particular position along the path, a sensor circuit having an input coupled to the output of the object detecting means and being operable responsive to an object detection signal to produce at an output a sensor signal, a timer circuit having an input coupled to the sensor signal output of the sensor circuit and being operable responsive to a sensor signal to produce at an output a delayed duration timer signal, and a driver circuit having an input coupled to the output of the timer circuit and being operable, in response to a delayed duration timer signal at its input, to produce a control signal at an output which is coupled to the discharge means, the improvement comprising:

means for introducing a simulated object detection signal to the input of the sensor circuit;

a first indicator coupled to the sensor circuit and actuable during at least a portion of the operation of the sensor circuit to produce a perceptible indication; and a second indicator coupled to the timer circuit and actuable during at least a portion of the operation of the timer circuit to produce a perceptible indication.

10. The improvement of claim 9 which further comprises a third indicator, coupled to the timer circuit, the second indicator being actuated during a delay interval produced by the timer circuit and the third indicator being actuated during a duration interval produced by the timer circuit.

* * * * *